No. 691,597. Patented Jan. 21, 1902.
A. P. CHRISTIANSEN.
BICYCLE ATTACHMENT.
(Application filed Mar. 2, 1901.)
(No Model.)

Witnesses

Inventor:
A. P. Christiansen,
by
Attorneys.

UNITED STATES PATENT OFFICE.

ANDREW PETER CHRISTIANSEN, OF GARDNERVILLE, NEVADA.

BICYCLE ATTACHMENT.

SPECIFICATION forming part of Letters Patent No. 691,597, dated January 21, 1902.

Application filed March 2, 1901. Serial No. 52,080. (No model.)

*To all whom it may concern:*

Be it known that I, ANDREW PETER CHRISTIANSEN, a citizen of the United States, residing at Gardnerville, in the county of Douglas and State of Nevada, have invented a new and useful Bicycle Attachment, of which the following is a specification.

This invention relates to improvements in bicycle attachments; and the object is to provide a simple and effective construction which may be readily applied to any bicycle for holding the front wheel normally in line with the frame of the machine, so that twisting thereof upon contact with an obstruction will be obviated and also by the use of which the handling of the bicycle will be facilitated, the wheel being normally held from turning, whereby the machine may be easily rolled by hand when the wheelman is walking and readily supported in upright position without danger of falling, as would be the case were the front wheel free to turn.

A further object is to provide a construction for the above-named purpose which while it will normally hold the wheel in alinement with the frame of a bicycle will also permit of the turning of the wheel for steering the bicycle and at the same time will automatically return it to its normal position when released.

With these objects in view the invention consists in the novel features of construction hereinafter fully described, particularly pointed out in the claims, and clearly illustrated by the accompanying drawings, in which—

Figure 1:
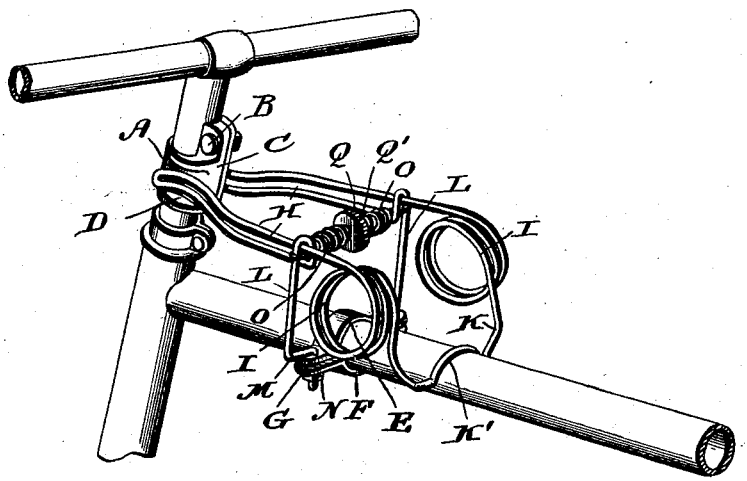
Figure 2:
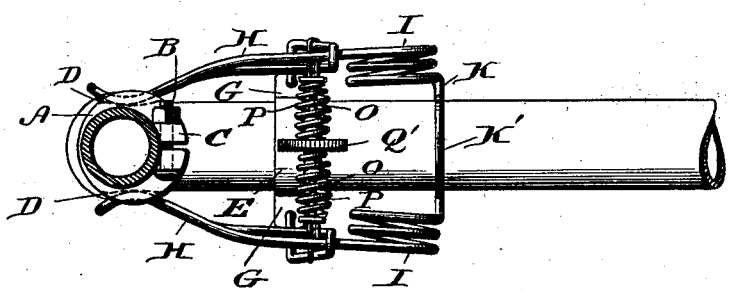
Figures 3, 4:
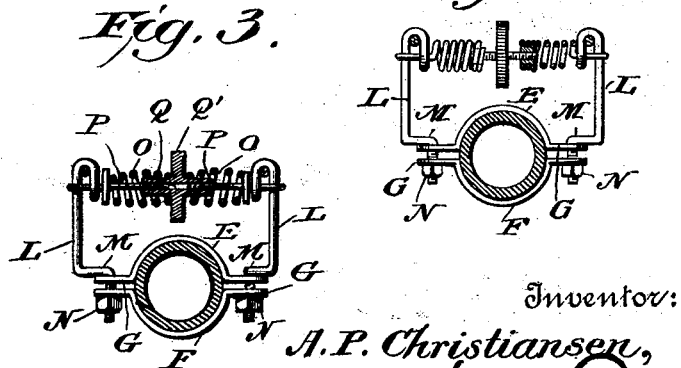

Figure 1 is a perspective view of an attachment embodying my invention, the same being shown in operative position upon a bicycle; Fig. 2, a top plan view of the same; Fig. 3, a transverse section showing the adjustment for the springs, and Fig. 4 is a similar view showing a slightly-modified arrangement for adjusting the tension of the jaws.

Referring now more particularly to the accompanying drawings, A designates a collar to be applied to the stem of the handle-bar, said collar being split at one side and made thin at its opposite side, whereby it may be separated far enough to be removed from and positioned upon the stem. Said bar is held securely in position by a bolt B, extending through screw-threaded perforations in enlargements C, formed at the upper edges of the collar near its split side. Said collar is formed on opposite sides with depressions or recesses D.

E and F designate two sections of a separable clasp which embraces the upper bar of the bicycle-frame at a point adjacent to the steering-head, each of said sections being formed with perforated ears G.

Spring-jaws H are provided for engaging in the recesses or depressions D of collar A and holding the front wheel in alinement with the frame, said jaws being formed in the present instance of a single piece of wire having at the inner ends of the jaws convolutions I and with a connecting portion K, which is formed with a central spring-loop K' to embrace the upper bar of the frame rearward of the clasp before referred to. These jaws are also formed in front of the convolutions with downwardly-extending arms L, which are screw-threaded on their lower ends and formed adjacent to said screw-threaded portions with shoulders M. These screw-threaded ends extend through the perforations of the clasp-sections E and F and receive nuts N, whereby the sections are securely held together and the jaws supported intermediately of their ends. Secured at their outer ends to arms L at their upper ends are coiled springs O, which springs extend inwardly transversely of the jaws and are positioned upon stems P, which stems are headed at their outer ends to prevent their pulling through the springs and are oppositely screw-threaded. Receiving the inner ends of the stems is a centrally-disposed adjusting-nut Q, provided with a milled finger portion Q'. When said nut is rotated, the screws are moved either inwardly or outwardly, according to the direction of the rotation of the nut, and the springs are adjusted to vary the tension upon the jaws, whereby the pressure of the latter upon opposite sides of the handle-bar stem is varied.

It will be understood that the jaws will be adjusted so as to be sufficiently yielding to permit the handle-bars to be moved in order to steer the bicycle and at the same time to exert a sufficient pressure to prevent the tendency of the wheel to turn when contacting with an obstacle or when being wheeled by hand or when it is desired to support the same in upright position. The tension of the small springs, however, may be varied, so that the pressure of the jaws may be increased to render the handle-bar substantially rigid.

In Fig. 4 I have shown a slightly-modified arrangement of the tension device, which consists of making the adjusting-nut with screw-threaded stems projecting from either side thereof and engaging nuts to which one end of the springs are fastened, the opposite ends of the spring being fastened to the arms L, as before stated.

Having thus fully described my invention, what I claim as new, and desire to secure by Letters Patent of the United States, is—

1. An attachment for bicycles comprising jaws adapted to engage on opposite sides of the handle-bar stem, coiled springs connected at their outer ends to the said jaws, stems upon which said springs are positioned, said stems having headed outer ends and oppositely-threaded inner ends, an adjusting-nut receiving the threaded ends of the stems, and means for attaching the device to the frame of a bicycle, substantially as described.

2. An attachment for bicycles comprising a pair of spring-jaws to engage on opposite sides of the handle-bar stem, said jaws formed of a single piece of wire having convolutions formed at their inner ends, and provided at said inner ends with a connecting portion having a spring-loop to embrace the bar of the bicycle-frame, and having downwardly-extending arms intermediately of their ends, the ends of which are screw-threaded, a separable clasp to be positioned upon the bar of the bicycle-frame having the sections thereof formed with perforated ears through which the threaded ends of the arms extend, nuts upon said threaded ends, springs connecting the jaws at the upper ends of said arms, and means for adjusting said springs, substantially as described.

3. An attachment for bicycles comprising a pair of yieldable jaws arranged to engage opposite sides of the handle-bar stem, a connection for uniting the jaws, having a loop to engage the framing of the bicycle, and arms depending from the jaws constituting a means whereby the attachment can be secured to the framework of a bicycle, substantially as described.

4. An attachment for bicycles comprising a pair of yieldable jaws arranged to engage opposite sides of the handle-bar stem, a connection for uniting the jaws, having a loop to engage the framing of the bicycle, and arms depending from the jaws constituting a means whereby the attachment can be secured to the framework of a bicycle, the whole being made of wire in one piece, substantially as described.

5. An attachment for bicycles comprising a pair of jaws arranged to engage opposite sides of the handle-bar stem, convolutions at the rear of the jaws, a transverse member uniting the convolutions having a loop, said loop and convolutions serving to unite the jaws and arms depending from the jaws, the whole being made of wire, substantially as described.

ANDREW PETER CHRISTIANSEN.

Witnesses:
B. G. JARVIS,
A. HARRIS.